United States Patent [19]
Lund

[11] Patent Number: 5,161,822
[45] Date of Patent: Nov. 10, 1992

[54] TILT CORRECTION SYSTEM

[75] Inventor: Mark A. Lund, Escondido, Calif.

[73] Assignee: TLC Suspension, San Diego, Calif.

[21] Appl. No.: 617,896

[22] Filed: Nov. 26, 1990

[51] Int. Cl.$^5$ .................. B62D 9/00; B60G 11/64
[52] U.S. Cl. .................. 280/772; 280/689;
280/710; 280/714; 137/625.69; 91/520; 92/162
R; 92/162 P; 92/131
[58] Field of Search ............. 280/772, 689, 702, 709,
280/710, 714, 723, 112.2; 267/218; 188/282,
288, 289, 317; 137/625.69; 91/520, 453; 92/162
R, 162 P, 131

[56] References Cited

U.S. PATENT DOCUMENTS

| | | | |
|---|---|---|---|
| 2,802,674 | 8/1957 | Jackson | 280/112.2 |
| 2,922,634 | 1/1960 | Shedd | 280/112.2 X |
| 3,152,610 | 10/1964 | McAfee, Jr. | 137/625.69 |
| 3,473,330 | 10/1969 | Fritz | 92/162 R |
| 4,497,394 | 2/1985 | Ferrand et al. | 188/282 |
| 4,519,627 | 5/1985 | Shibahata et al. | 280/112.2 X |
| 4,534,435 | 8/1985 | Shibahata et al. | 280/112.2 X |
| 4,588,054 | 5/1986 | LeBaron | 188/282 X |
| 4,589,678 | 5/1986 | Lund | 280/772 |
| 4,779,512 | 10/1988 | Leonard | 137/625.69 X |
| 4,966,390 | 10/1990 | Lund et al. | 280/112.2 X |
| 5,040,823 | 8/1991 | Lund | 280/112.2 X |

FOREIGN PATENT DOCUMENTS 2006131 5/1979 United Kingdom ............... 280/689

*Primary Examiner*—Charles A. Marmor
*Assistant Examiner*—Tamara L. Graysay
*Attorney, Agent, or Firm*—Baker, Maxham, Jester & Meador

[57] ABSTRACT

The invention concerns a tilt correction system with at least one pair of cylinder and piston assemblies which are hydraulically operated. The extent of tilt correction is limited by grooves internal to the cylinders of the assemblies which short hydraulic potentials once the pistons of the assemblies have moved from a rest position to a position adjacent the grooves. A preferable arrangement includes connecting each assembly between an anti-roll bar and an axle.

14 Claims, 5 Drawing Sheets

TILT CORRECTION SYSTEM

CROSS-REFERENCE TO CO-PENDING APPLICATIONS

This application contains material related to material found in U.S. patent application Ser. No. 07/563,048, filed Aug. 6, 1990 now U.S. Pat. No. 5,040,823, and in U.S. patent application Ser. No. 07/397,723, Filed Aug. 23, 1989, now U.S. Pat. No. 4,966,390. Both of these patent applications are assigned to the assignee of this application.

BACKGROUND OF THE INVENTION

The invention disclosed and claimed herein relates to a tilt correction system for a vehicle and, more particularly, to a hydraulically-operated, tilt correction system which levels a vehicle during a turn-induced roll.

Generally, in the operational environment of the invention, there is found a vehicle such as an automobile having a body, four tires, two front and two rear, axles for mounting the front and rear wheels to the body, and a suspension connecting the vehicle body to the axles.

When a vehicle turns, the suspension permits the vehicle body to rotate about its longitudinal axis in response to the rolling force exerted on the body during the turn. Typically, vehicle passengers experience this effect as a tilt of the vehicle body, with the side of the body on the outside of the curve being relatively lower than the side of the body on the inside.

Anti-roll systems known in the art counteract vehicle roll by providing a lifting force acting between the vehicle body and suspension on the outside of the curve or a vehicle lowering force acting between the body and suspension on the inside turn side of the vehicle. Some anti-roll systems in the art provide complementary lifting and lowering forces simultaneously.

In the related patent applications, a system for roll compensation is taught in which a valved hydraulic signal generator provides a differential hydraulic signal indicative of vehicle roll. The hydraulic signal includes pressurizing and return components. Pairs of cylinder and piston assemblies are provided for roll correction at the rear and front wheels of the vehicle. The system includes a hydraulic circuit connected to the valved hydraulic signal generator and to the cylinder and piston assemblies for conducting the differential hydraulic signal to all of the cylinder and piston assemblies. In conducting the signal, the circuit provides the pressurizing potential of the signal to move the pistons in the cylinder and piston assemblies in complementary directions on either side of the vehicle. The piston directions counteract the roll of the vehicle and thereby level the vehicle when it turns. The systems include a tilt limitation means connected to the hydraulic circuit for limiting the maximum displacement of the pistons in the front wheel cylinder and piston assemblies, which limits the amount of roll correction afforded by the system.

Tilt limitation in these systems is afforded a cylinder and piston assembly with upper and lower ports and at least a third port between the upper and lower ports. When the piston moves a certain distance, the middle port is opened, providing a shunt to the hydraulic pressure moving the piston.

While the tilt-limited, anti-roll systems of the cross-referenced patent applications have met with general approbation, a need still exists for a very simple anti-roll system with tilt limitation which is easy to install and simple to manufacture, yet which retains advantages of the cross-referenced systems.

SUMMARY OF THE INVENTION

The present invention provides roll correction with a minimum of components. The invention is based upon the inventor's realization that the amount of roll correction can be limited by a cylinder and piston assembly which shunts the roll correction pressure entirely within the cylinder. This eliminates the need for more than two ports on the cylinder and reduces the amount of hydraulic circuitry required for system operation.

Fundamental to the system is a correction cylinder and piston assembly including a hydraulic cylinder attached between an axle and a vehicle body and including a pair of spaced-apart hydraulic ports which open into the cylinder, a hydraulic piston disposed in the cylinder for slideable movement between the ports in response to the provision of the hydraulic signal at the ports, a positioning mechanism for returning the piston to a rest position between the ports in the absence of a hydraulic signal, and means internal to the cylinder which shunt a correcting pressure past the piston after the piston has moved a certain distance. These means may include grooves on the inner surface of the cylinder, a first of which extends substantially axially between a first port and the rest position and a second of which extends substantially axially between the second port and the rest position. At the rest position, the inner surface of the cylinder presents an annular section which is ungrooved and with which the piston forms a hydraulic seal.

When the hydraulic signal is introduced into the cylinder through the ports, a pressurizing potential is provided through one port and a return potential through the other. In response to the hydraulic signal, the piston moves away from the rest position toward the port conducting the return signal until it encounters a groove between that port and the rest position. When encountered, the groove conducts the pressurizing potential around the piston, thus limiting the excursion of the piston in the cylinder. Since the piston is activated to counter roll induced by a turn, limitation of its excursion limits its counteracting effect. In the absence of hydraulic pressure, the return mechanism returns the piston to the rest position.

Connection to an anti-roll bar augments the tilt correction operation of this component.

An objective of the present system is, therefore, to provide tilt compensation in a vehicle while limiting the amount of correction afforded.

An advantage of the invention is that the limited correction is provided by the cylinder and piston mechanism which eliminates a significant amount of hydraulic conduction from previous systems.

A further advantage lies in connection of a tilt-limited roll correction assembly to an anti-roll bar to impart added roll correction.

These and other objects and advantages of the invention will become apparent from the following detailed description when read with reference to the accompanying drawings which illustrate preferred embodiment and best mode of the invention by way of example.

DETAILED DESCRIPTION OF THE PREFERRED EMBODIMENT

Figure 1:
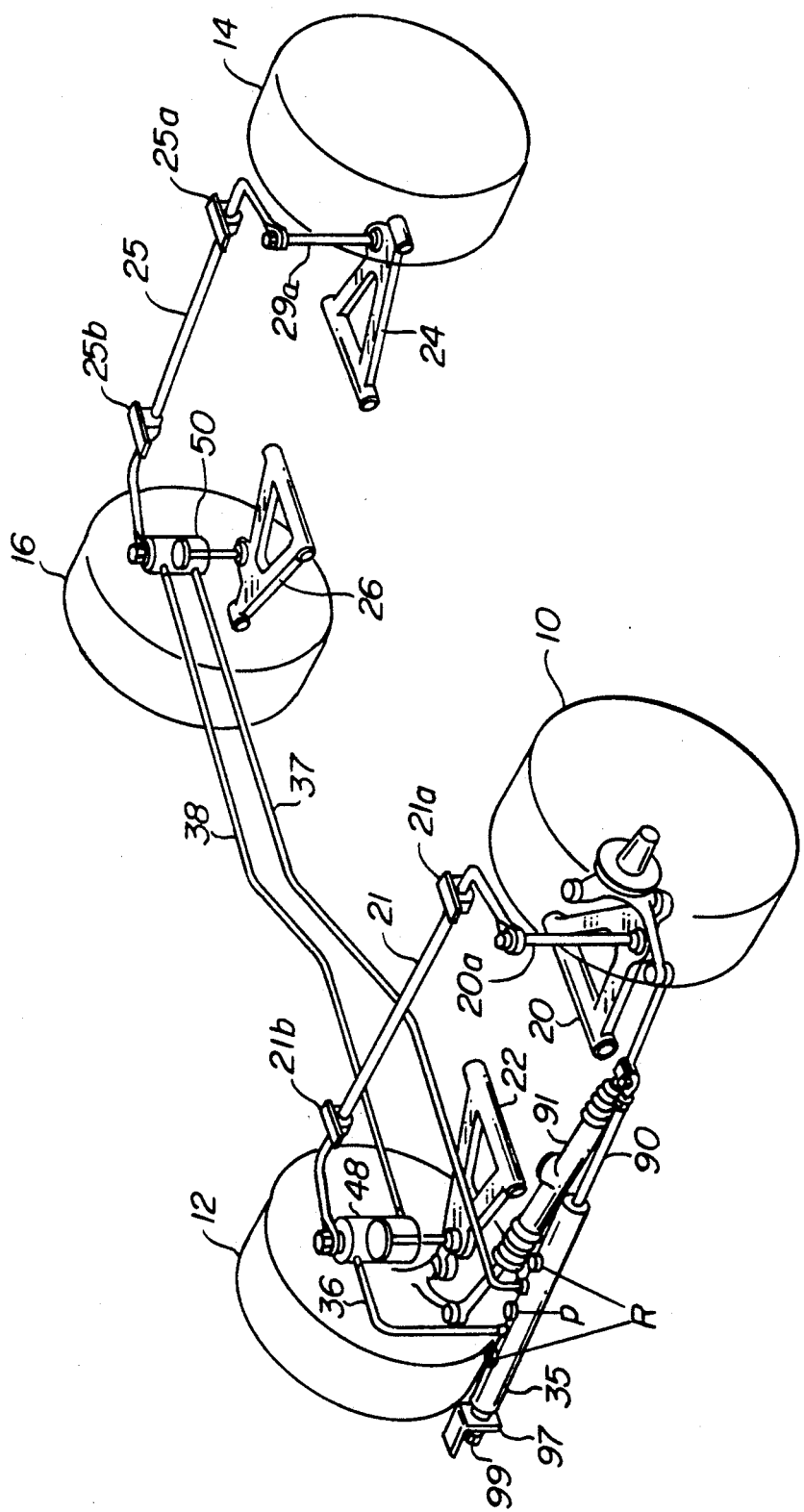
FIG. 1 is a three dimensional representation demonstrative of the preferred embodiment of the invention in an operational environment.
Figure 2:
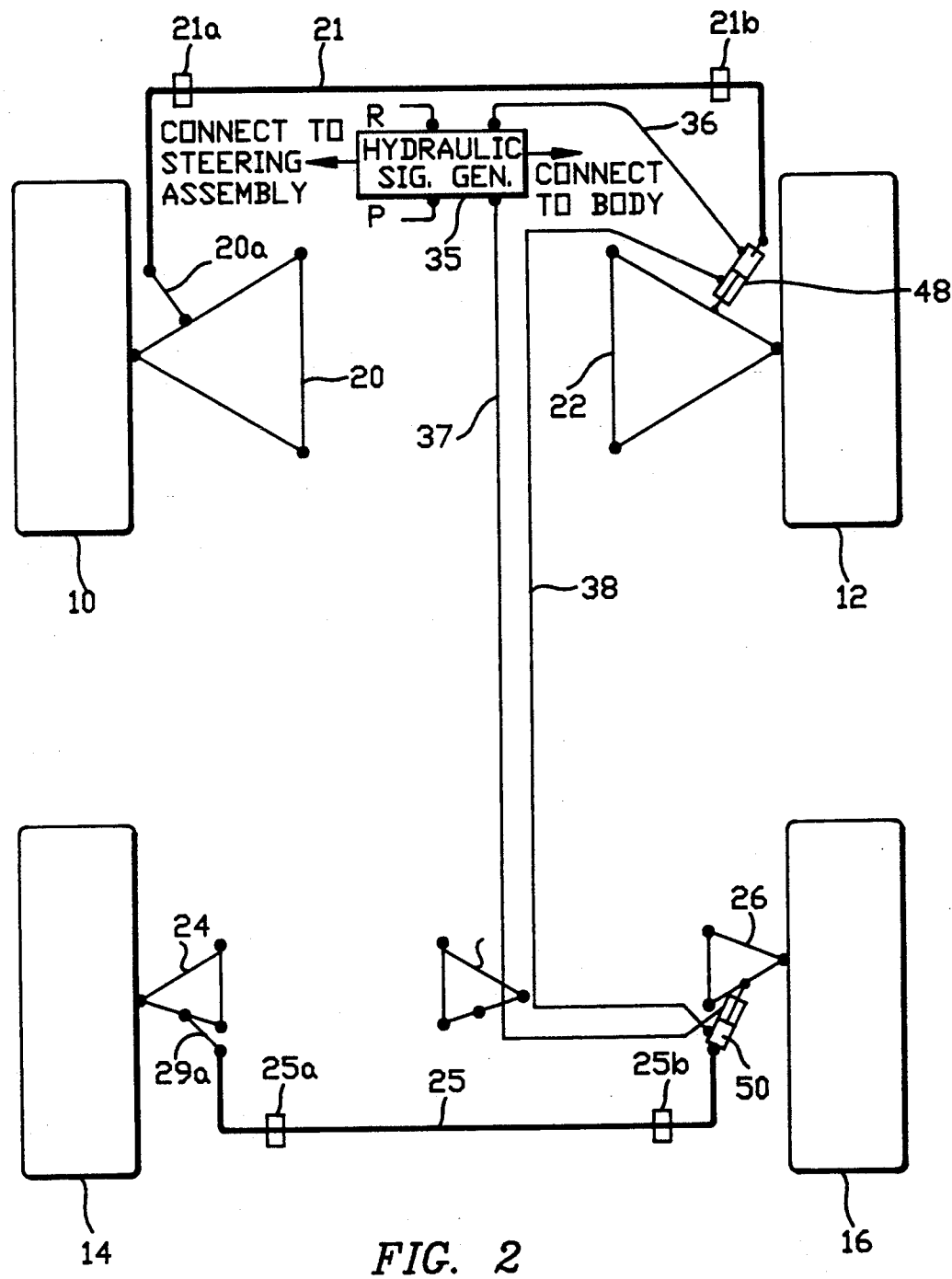
FIG. 2 is a hydraulic schematic showing how the invention is connected for operation.

Referring to FIGS. 1 and 2, the illustrated partial representation of an automobile includes a pair of front wheels 10 and 12, and a pair of rear wheels 14 and 16. In the automobile, a set of suspension components 20, 21, and 22 are connected to the front wheels 10 and 12, while the rear wheels are connected to suspension components 24, 25, and 26.

The front wheel suspension components include a first "A" (or lower control) arm 20 connected by conventional linkage 20a to one end of an anti-roll bar 21. The anti-roll bar is anchored at 21a and 21b to the vehicle body and is connected through one component of the system of the invention to another "A" arm 22. The wheels 10 and 12 are conventionally mounted on the suspension A arms, 20 and 22, respectively.

At the rear of the automobile, the suspension component 24 includes an "A" arm rotatably connecting the rear wheel 14 to the vehicle body. The suspension component 26 similarly includes an "A" arm rotatably connecting the rear wheel 16 to the vehicle body. An anti-roll bar 25 is conventionally linked by linkage 29a to the "A" arm 24. The anti-roll bar 25 is secured to the vehicle body at 25a and 25b. The other end of the anti-roll bar 25 is connected to the "A" arm 26 by another component of the system of the invention.

The invention includes a hydraulic assembly embracing a hydraulic fluid signal source 35 which provides a hydraulic signal indicative of turn direction, and three hydraulic conductors 36, 37, and 38. The signal source 35 generates a hydraulic signal indicative of turn direction in response to movement of a steering mechanism (91). The hydraulic fluid signal includes complementary pressurizing (P) and return (R) components. Preferably, for a right-hand turn, the signal source 35 connects the return potential to the conductor 36 and the pressurizing potential to the conductor 37. For a left-hand turn, the P potential is connected to the conduction 36 and the R potential to the conductor 37.

The system of the invention also includes a pair of cylinder and piston assemblies 48 and 50. The assemblies include pistons which are slideably disposed inside of cylinders. Each cylinder includes a port which opens through the cylinder to the face of a piston which is connected to a piston rod, and a port which opens through the cylinder to the other face of the piston. For convenience, these ports are called, respectively, the first and second ports. The first port of the cylinder 48 is connected, through the hydraulic conductor 38, to the second port of the cylinder 50. The second port of the cylinder 48 is connected to hydraulic conductor 36, while the first port of the cylinder 50 is connected to the hydraulic conductor 37.

Each cylinder and piston assembly is connected between an anti-roll bar and a suspension mechanism. In the front of the vehicle, the cylinder of the cylinder and piston assembly 48 is connected through a pivoted linkage to one end of the anti-roll bar 21. The piston rod of the assembly 48 is connected to the right front A-arm. In the rear of the vehicle, the cylinder of the cylinder and piston assembly 50 is pivotally connected to one end of the rear anti-roll bar 25, while the piston rod of the assembly is connected to the "A" arm 26.

In operation, during a right-hand turn, the left-hand side of the vehicle dips to the outside of the turn, while the right-hand side of the vehicle lifts. This moves the left-hand side of the body toward the suspension and expands the cylinder and piston assemblies 48 and 50. The operation of the invention counteracts this turn-induced dip by compressing the assemblies 48 and 50.

When the steering mechanism is operated to turn the vehicle to the right, the hydraulic signal source 35 pressurizes the conductor 37 and connects the return potential to the conductor 36. The pressurization of the conductor 37 is fed to the first port of the cylinder and piston assembly 50. This pressurizes the bottom of the piston in the assembly 50 pushing it toward the second port of the assembly. Resultantly, hydraulic fluid moves out of the second port through the conductor 38 and pressurizes the bottom of the piston in the assembly 48. This piston is forced to move toward the second port of the assembly 48 where the return potential is connected.

As FIGS. 1 and 2 illustrate, the connection of the assemblies 48 and 50 between respective wheel assemblies and anti-roll bars causes their joint correction actions to be imparted to the vehicle. During the right-hand turn, the just-described action of the assemblies pulls the right side of the vehicle toward the wheels, thereby correcting the roll. Next, since the assemblies are connected to the anti-roll bars, they augment or enhance the roll-correcting action of those bars. Thus, the assemblies 48 and 50 impart roll correction which supplements that already available from the anti-roll bars; in this regard, they provide "active" tuning of the anti-roll bars.

When the turn is completed, the steering mechanism returns to a neutral or center position and the signal source removes the differential hydraulic potentials in the conductors 36 and 37. This permits the pistons of the cylinder and piston assemblies 48 and 50 to be returned to a center position in preparation for the next correction.

Assume now that the vehicle turns left, which dips the right-hand side of the vehicle, compressing the cylinder and piston assemblies 48 and 50. In this instance, the signal source 35 pressurizes the conductor 36 and connects the return potential to the conductor 37. Pressure is introduced into the second port of the assembly 48 which drives the piston toward the first port, thereby expanding the assembly. Hydraulic fluid exiting from the first port of the assembly 48 is introduced through the conductor 38 into the second port of the assembly 50 driving the piston toward the first port. The return potential in the conductor 37 permits the piston and assembly 50 to move toward the first port. When the turn is finished, the steering mechanism and the assemblies 48 and 50 return to their center positions.

The tilt correction excursion of the cylinder and piston assemblies is limited by means internal to the cylinders of those assemblies. Tilt limitation can be understood with reference to FIG. 3 where a cylinder and piston assembly essentially equivalent to the assemblies 48 and 50 of FIGS. 1 and 2 is illustrated. As shown, the cylinder and piston assembly 52 includes a hydraulic cylinder 54 having a first port 56 and second port 58. The ports 56 and 58 are displaced axially on the cylinder 54 and open into its interior. A hydraulic piston 60 is slideably disposed in the cylinder 54 and is returned to a rest position by springs 62 and 63. The spring 62 acts between one end of the cylinder 54 and one face of the piston 60, while the spring 63 acts between the opposite end of the cylinder 54 and the opposite face of the piston 60. Hydraulic fluid flows into and out of the cylinder 54 through the ports 56 and 58. When equal pressure is present at the ports 56 and 58, the springs 62 and 63 center the piston 60 axially in the rest position in the interior of the cylinder 54.

The rest position is a smooth annular surface in the interior of the cylinder 54. It has an axial dimension (height) h which is greater than the height h' of the piston 60. A piston ring 60a forms a fluid seal between the piston 60 and the rest position surface of the cylinder.

The interior of the cylinder 54 is grooved on either side of the central position to which the piston 60 is returned. Two grooves are illustrated on each side of the piston 60, with the grooves 64 between the piston 60 and the port 58 and the grooves 66 between the piston 60 and the port 56. Preferably, each groove is substantially parallel to the common axis of the cylinder 54 and the piston 60, and each extends between one of the ports 56 and 58 and a location at an edge short of the rest position.

The grooves limit the excursion of the piston 60 toward either of the ports 56 and 58 by providing a shunt path which short-circuits the pressurizing to the return potential once the piston 60 has uncovered a groove.

For example, assume that the differential hydraulic signal is introduced to the cylinder 54 with the pressure potential provided through the port 56 and the return potential through the port 58. This causes the cylinder to move away from the rest position toward the port 58. In moving toward the port 58, the surface of the piston 60 which contacts the spring 62 will eventually move past the upper ends of the grooves 64. At this position, the pressurizing potential will be shunted through the grooves 64 around the sides of the piston 60 to the return potential at the port 58.

Similarly, if the port 58 is pressurized, the grooves will shunt the pressurizing potential to the port 56 when the surface of the piston 60 contacted by the spring 63 moves beyond the ends of the grooves 66.

Figure 3:
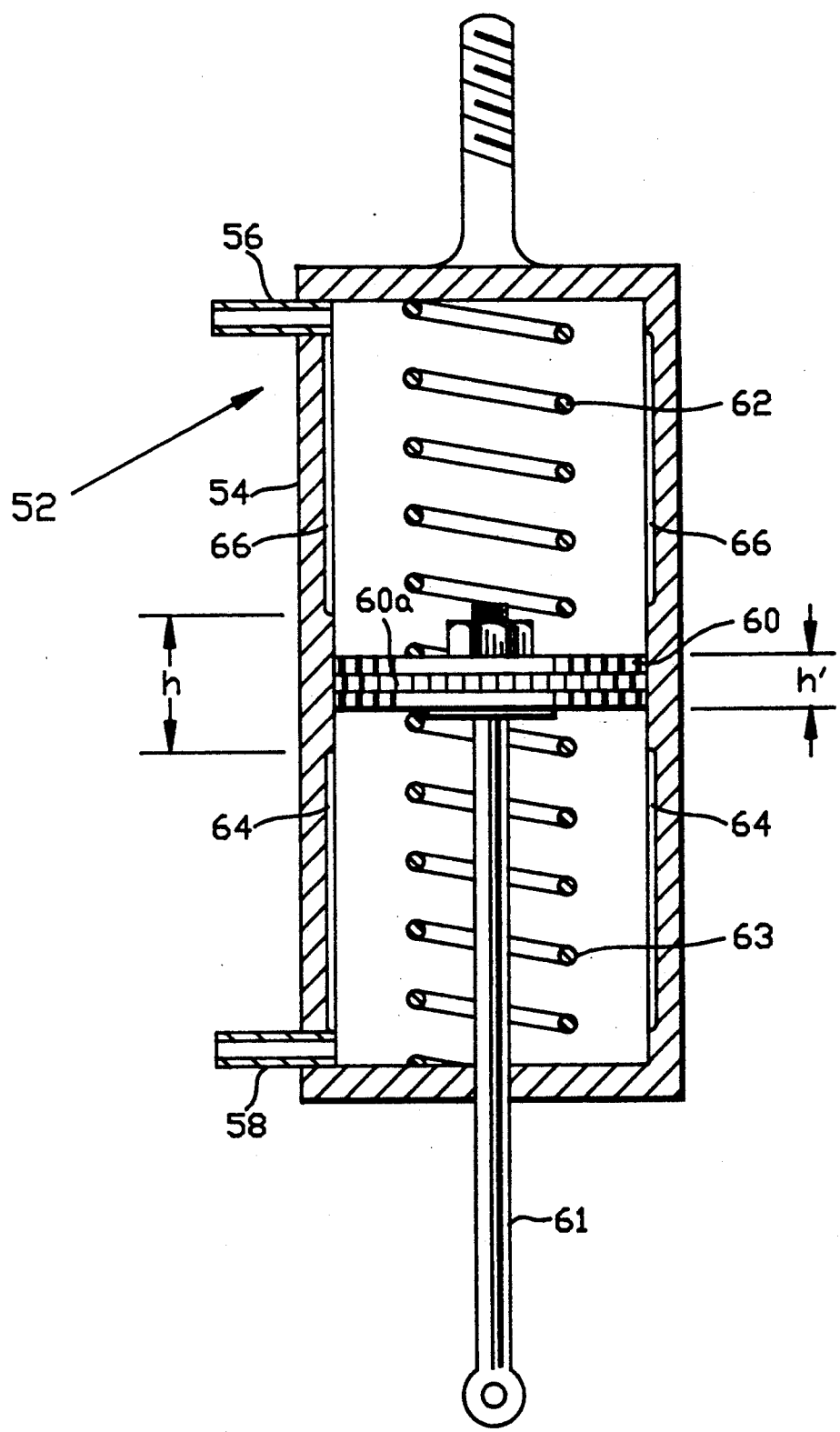
FIG. 3 is an enlarged side section of a cylinder and piston assembly in FIGS. 1 and 2.
Figure 4A:
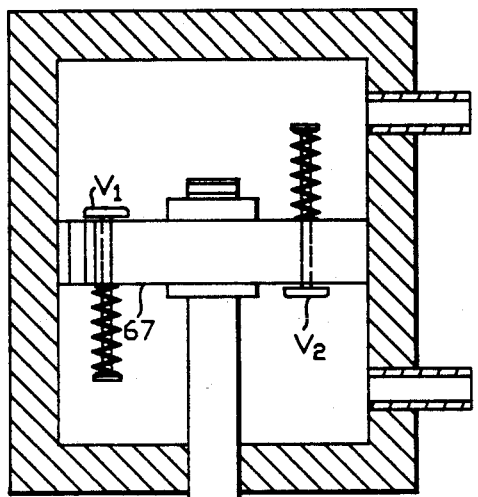
FIGS. 4A, 4B, and 4C illustrate alternate cylinder and piston assembly configurations which provide roll correction limitation.
Figure 4B:
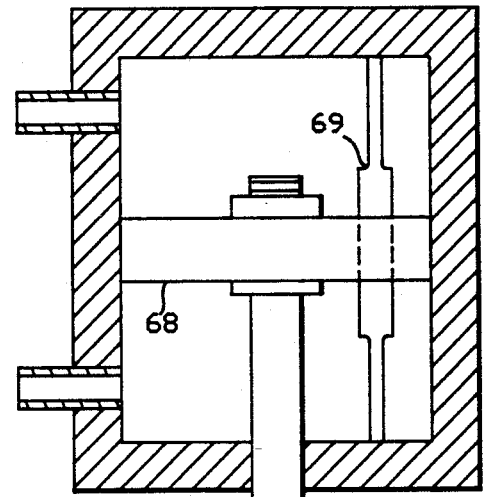
Figure 4C:
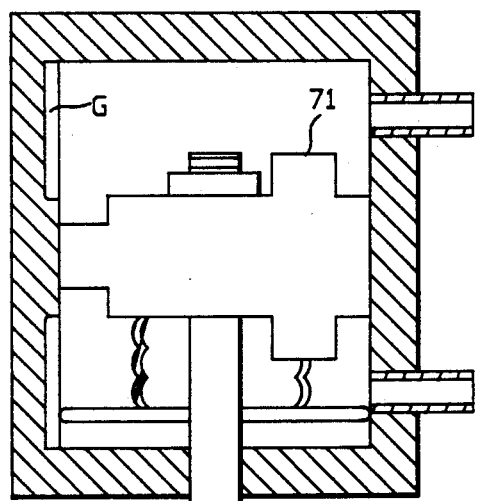

The advantage of the grooves in the cylinder of FIG. 3 is that roll correction limitation is effected by a means internal to the cylinder, which shunts the first to the second port without the piston moving from between them. This obviates the need for a third port through the cylinder between the first and second ports and the extra hydraulic circuitry needed to connect the third port. Other mechanisms for internally shunting the first and second ports past the piston are shown in FIGS. 4A, 4B, and 4C. In FIG. 4A, two spring-loaded values $V_1$ and $V_2$ are provided through holes in the piston 67. When the piston 67 moves toward an end of the cylinder, a stem of one value will be engaged and the value will open, shunting hydraulic pressure through the piston. In FIG. 4B, a rod 68 is fixed between ends of the cylinder. The piston 69 has a hole through it which engages the rod 68. The rod 68 has a large middle diameter which seals the piston hole. However, as the piston moves along the rod 68, a smaller diameter is encountered which opens the piston hole and shunts hydraulic pressure past the piston. FIG. 4C shows that by circumferentially varying the thickness of the piston 71, and rotating the piston in a cylinder with internal grooves, varying amounts of roll correction limitation can be afforded.

It should be appreciated here that FIGS. 1 and 2 show a preferred embodiment which suggests many variations. For example, only a single cylinder and piston assembly could be provided at either the front or rear of the automobile to generate roll-correction movement. In either case, connection would be between the end of an anti-roll bar and a wheel assembly. Furthermore, tilt limitation in the form of the internal grooves, or other appropriate means inside or outside the cylinder and piston assembly, would be provided.

In another variation, a second pair of cylinder and piston assemblies could be added to the left-hand side of the vehicle in FIGS. 1 and 2. These added assemblies would be hydraulically connected as shown in FIGS. 1 and 2; each would be connected between the end of an anti-roll bar and an axle.

Figure 5:
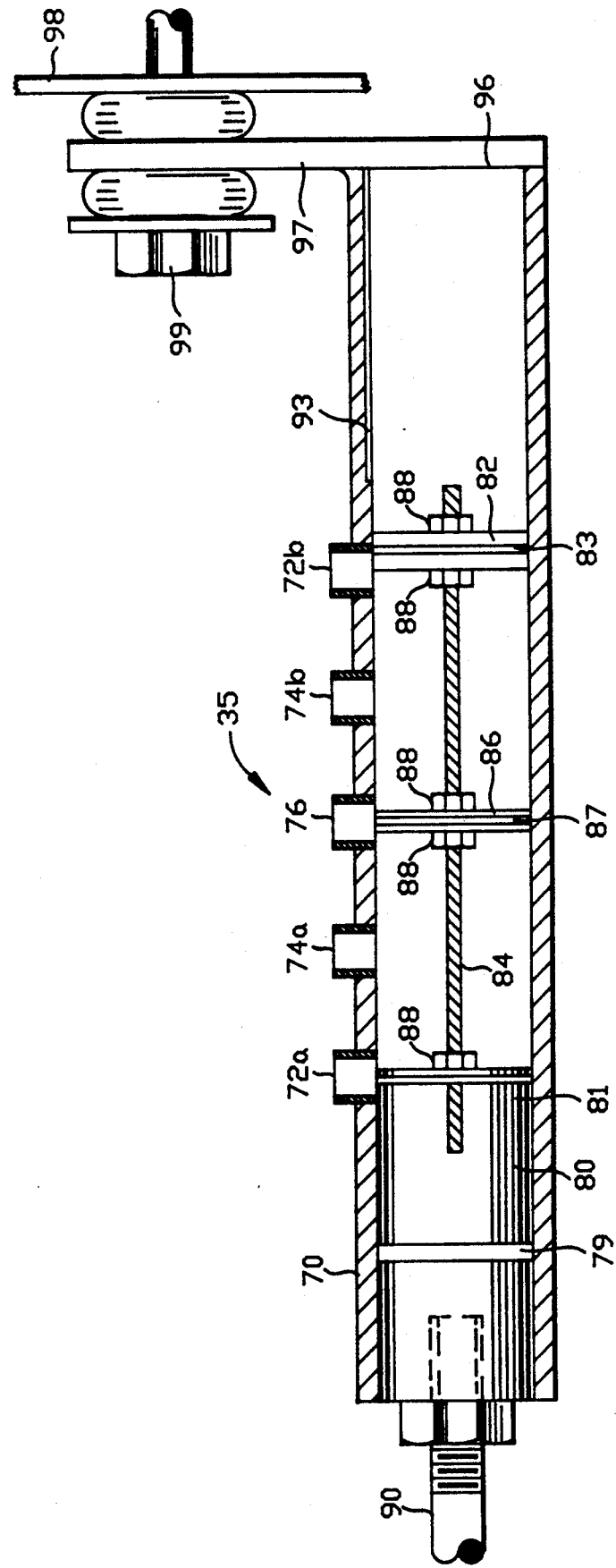
FIG. 5 is an enlarged side sectional view illustrating a mechanism for generating a hydraulic fluid signal for the system of FIGS. 1 and 2.

The hydraulic signal source is illustrated in FIG. 5 where an elongate hydraulic cylinder 70 includes a first set of axially-spaced ports 72a and 72b, a second pair of axially-spaced ports 74a and 74b, and a middle port 76. The ports 74a and 74b are positioned between the ports 72a and 72b. The middle port 76 is positioned between ports 72a and 72b and between ports 74a and 74b. All ports open from the outside to the interior of the hydraulic cylinder 70 and are for conducting hydraulic fluid into or out of the cylinder. A hydraulic piston assembly is slideably disposed in the cylinder 70 and includes a first end piston 80 with a piston ring 81 and a rod seal 79, and a second end piston 82 with a piston ring 83. The end pistons 80 and 82 are connected by a threaded central rod 84 which has two ends, each received in a threaded recess in a respective end piston 80 or 82. A middle, relatively thin, piston 86 is threaded on to the rod 84, centered midway between the end pistons 80 and 82. A piston ring 87 is seated on the outside annular surface of the middle piston 86. The pistons 80, 82, and 86 are fixed on the threaded rod 84 by lock nuts 88. The piston assembly is moved by a rod 90 which is connected to the steering mechanism 91 of the vehicle of FIG. 1. The rod 90 may be connected, for example, to the rack and pinion steering rod of a conventional steering system. The cylinder 70 is fixedly mounted via a flange 97 or cylinder end 96 to the body of the automobile of FIG. 1, represented by 98. The flange 97 is fixed to the body at 98 by a nut and bolt assembly 99. A groove 93 is cut in the cylinder 70 and extends axially on the inner surface of the cylinder from an edge of the port 72b toward the flange 97.

In FIG. 5, the hydraulic signal source is shown with a preferred hydraulic hook-up in which the middle port 76 is connected to the pressure (P) potential output by a hydraulic pump (not shown), while the outside pair of ports 72a and 72b are connected to the return (R) potential of the pump.

The hydraulic signal source is shown at its rest (inactive) position in FIG. 5. In the rest position, the end pistons 82 and 80 rest adjacent the "outboard" edges of the ports 72a and 72b. The middle piston 86 rests centered in the middle port 76. The piston 86 is thin enough that it does not close the port 76. That is, the opening of the middle port is wide than the center piston.

At the rest position illustrated in FIG. 5, the pressurizing potential is shorted around either side of the piston 86 through the ports 72a and 72b to the return potential. When the vehicle turns in one direction, the steering assembly pushes the rod 90 toward the flange 97, moving the internal piston assembly to the right in FIG. 5. As the piston assembly moves to the right, the end piston 81 eventually covers the port 72a, while the end piston 82 moves away from and completely uncovers the port 72b. At the same time, the middle piston 86 moves in the cylinder 70 to a position between the port 76 and the port 74b. At this position, the piston ring 87 seals against the inner surface of the cylinder 70 and isolates the pressurizing potential from the return potential. Now, the return potential at the port 72 is provided through the port 74b, while the pressurizing potential at the port 76 is provided through the port 74a. As thus far described, the movement of the piston assembly has been toward the flange 97. As soon as the end piston 82 moves rightward (in FIG. 5), it uncovers the groove 93. This groove permits hydraulic fluid to be displaced around the end piston 82 while it moves toward and away from the flange 97.

When the turn is finished, the steering assembly is moved back to its neutral position, pulling the rod 90 outwardly from the cylinder 70 and returning the piston assembly to the position illustrated in FIG. 3.

When turning in the other direction, the rod 90 is pulled further outwardly from the cylinder 70. This movement causes the end piston 82 to move between the ports 72b and 74b. This effectively "closes" the port 72b to the other ports, while the port 72a is completely opened. At the same time, the middle piston 86 is moved between the port 74a and the port 76, again separating the two potentials of the differential hydraulic signal. Now, the pressurizing potential is provided to the port 74a, and the return potential through the port 74b.

Obviously, many modifications and variations of this invention may be practiced without deviating from the spirit and scope of the claims. For example, FIG. 5 illustrates the preferred connection of the pressurizing and return potentials. However, it is contemplated that the return potential could be provided through the port 76 and the pressurizing potential through the ports 72a and 72b. Further, in FIGS. 1 and 2, the orientations of the cylinder and piston assemblies 48 and 50 can be changed to suit the particular requirements of any specific installation. Of course, appropriate reconnection of the hydraulic conductors might be necessitated by such reorientation. However, this would be within the range of skill of the average artisan. Also, as few as one, and as many as four, or more, cylinder and piston assemblies can be used in a system corresponding to that illustrated in FIGS. 1 and 2. Each assembly would be appropriately connected to the hydraulic signal source and would act between an anti-roll bar and a wheel axle. Each assembly would also be limited in the amount of tilt correction which it could introduce either by internal grooves as in FIG. 2 or by other appropriate measures. Alternatively, as few as one and as many as four or more of the illustrated cylinder and piston assemblies can be connected between an axle and any other appropriate point to impart roll correction to the vehicle. Further, all of these configurations can be appropriately adapted for response to impulse changes as would be incurred from bumps and potholes. For example, shock absorption mechanisms for similar assemblies are illustrated and described in U.S. Pat. No. 4,966,390.

I claim:

1. In a vehicle with a steering assembly, a vehicle tilt correction system with tilt correction limitation, comprising:
   a hydraulic signal source with means for coupling to the steering assembly for producing a hydraulic fluid signal indicating turn direction in response to operation of the steering assembly;
   at least one correction cylinder and piston assembly, the correction cylinder and piston assembly including a cylinder with a pair of hydraulic ports, a piston slideably disposed in the cylinder for movement between the ports, and means within the cylinder for shunting a hydraulic pressure component of the hydraulic fluid signal to one port of the pair of hydraulic ports in response to the position of the piston in the cylinder between the hydraulic ports; and
   a hydraulic circuit connecting the ports of the cylinder to the hydraulic signal source.

2. A system for tilt correction in a vehicle with front and rear anti-roll bars and front and rear wheels,
   hydraulic signal means for providing a hydraulic fluid signal indicative of vehicle turn direction;
   at least one correction cylinder and piston assembly, the correction cylinder and piston assembly including a cylinder with a pair of spaced-apart hydraulic ports, a piston slideably disposed in the cylinder between the ports for movement toward one or another of the ports, and means within the cylinder for shunting a hydraulic pressure component of the hydraulic fluid signal past the piston to one port of the pair of hydraulic ports in response to the position of the piston in the cylinder between the hydraulic ports;
   the cylinder and piston assembly acting between an end of a first anti-roll bar and a first wheel; and
   a hydraulic circuit connecting the ports of the cylinder to the hydraulic signal source for conducting a hydraulic fluid signal to the ports.

3. The system of claim 2 including a pair of cylinder and piston assemblies, wherein each cylinder has a top port and a bottom port and wherein the hydraulic circuit includes a first hydraulic line connecting the top port of a first cylinder and piston assembly to the bottom port of a second cylinder and piston assembly, a second hydraulic line connecting the bottom port of the first cylinder and piston assembly to the hydraulic signal means, and a third hydraulic line connecting the top port of the second cylinder and piston assembly to the hydraulic signal means.

4. The system of claim 2, wherein the hydraulic signal means includes an elongate cylinder and a piston, assembly slideably disposed in the elongate cylinder:
   the elongate cylinder including:
      a first pair of ports axially displaced by a first distance on the elongate cylinder, the first pair of ports for connection to a, first hydraulic potential;
      a second pair of ports axially displaced by a second distance less than the first distance on the elongate cylinder and positioned between the first pair of ports, the second pair of ports for connection to the hydraulic circuit; and a middle port positioned between the ports of the first pair of ports and the ports of the second pair of ports on the elongate cylinder, the middle port for connection to a second hydraulic potential; and the piston assembly including:
a first end piston;
a second end piston;
means for maintaining the first and second end pistons in a spaced relationship in which the first and second end pistons do not cover any of the ports; and
a middle piston mounted on the means and adjacent the middle port, the middle port being wider than the middle piston.

5. The system of claim 4, the piston assembly being slideable within the elongate cylinder to a first position wherein:
the first end piston covers a first port of the first pair of ports;
a first port of the second pair of ports is in fluid communication through the elongate cylinder with the middle port;
the middle piston is located between the middle port and a second port of the second pair of ports; and
the second port of the second pair of ports is in fluid communication with a second port of the first pair of ports.

6. The system of claim 5, the piston assembly being slideable in the elongate cylinder to a second position wherein:
the first port of the first pair of ports is in fluid communication with the first port of the second pair of ports;
the middle piston is located between the middle port and the first port of the second pair of ports;
the second end piston blocks the second port of the first pair of ports from fluid communication with any other port; and
the middle port is in fluid communication through the elongate cylinder with the second port of the second pair of ports.

7. The system of claim 2, the cylinder including an inner surface wherein the means for shunting includes at least one groove on the inner surface of the cylinder, the groove extending between a rest position of the piston and a first port of the pair of ports, the rest position being a substantially annular portion of the inner surface of the cylinder located between the pair of ports.

8. A hydraulic cylinder and piston assembly, comprising:
a hydraulic cylinder;
at least two ports in said cylinder for conducting hydraulic fluid into and out of said cylinder, the ports spaced apart axially on said cylinder;
an annular surface portion on an inner surface of said cylinder positioned between said ports and defining a rest position within said cylinder;
at least one groove on the inner surface of said cylinder, said groove extending between a first port of said ports and said rest position;
a piston slideably disposed in said cylinder for moving from said rest position toward said first port in response to a hydraulic fluid signal acting through said ports; and
means for returning said piston to said rest position in the absence of said hydraulic fluid signal.

9. The hydraulic cylinder and piston assembly of claim 8, further comprising a second groove extending between a second port of said at least two ports and said rest position, and wherein said piston is for moving from said rest position toward said first port or said second port in response to said hydraulic fluid signal acting through said ports and said return means for returning said piston to said rest position in the absence of said hydraulic fluid signal.

10. A hydraulic cylinder and piston assembly, comprising:
a hydraulic cylinder;
two ports in the cylinder for conducting hydraulic fluid into and out of the cylinder, the ports spaced apart axially on the cylinder;
a hydraulic piston slideably disposed in the cylinder for movement between the two ports in response to hydraulic pressure acting through a first one of said two ports; and
means in the cylinder for shunting the hydraulic pressure past the piston to a second one of the two ports in response to movement of the piston.

11. The hydraulic cylinder and piston assembly of claim 10 further including:
a position in the cylinder at which the piston is located in the absence of hydraulic pressure;
means for returning the piston to the position in the absence of hydraulic pressure; and
wherein, the means for shunting includes a groove on the inner surface of the cylinder, the groove located substantially between the position and the second port.

12. An anti-roll system for a vehicle with a body and wheels rotatably connected by axles to the body, comprising:
an anti-roll bar attached to the vehicle body and to an axle;
a hydraulic cylinder and piston assembly connected to the anti-roll bar and to a second axle for imparting a roll correction movement to the vehicle body, the cylinder and piston assembly including:
a hydraulic cylinder;
two ports in the cylinder for conducting hydraulic fluid into and out of the cylinder, the ports spaced apart axially on the cylinder;
an annular surface portion on an inner surface of the cylinder, positioned between said two ports;
a piston slideably disposed in the cylinder for moving from the Annular surface toward a first port of said two ports in response to hydraulic fluid pressure acting through a second port of said two ports; and
means for preventing said piston from moving beyond a limit position in said cylinder, said limit position located between said annular surface and said first port.

13. The anti-roll system of claim 12, wherein the means for preventing includes grooves in said cylinder extending between said first port and said annular surface.

14. An anti-roll system for a vehicle with a body and wheels rotatably connected by axles to the body, comprising:
an anti-roll bar attached to the vehicle body and to an axle;
a roll-correction means connected to the anti-roll bar and to a second axle for imparting a roll-correction movement to the vehicle body which counteracts rolling movement of the vehicle body; and means for limiting the amount of roll correction movement imparted by the roll correction means;

the roll correction means including:

a hydraulically-actuated, roll-correction assembly which produces the roll correction movement in response to a hydraulic signal indicative of a vehicle turn direction; and a hydraulic signal source which produces the hydraulic signal in response to a vehicle turn;

the hydraulically-actuated roll-correction assembly including a hydraulic cylinder and piston assembly, and the means for limiting the amount of roll correction movement being in the hydraulic cylinder and piston assembly, wherein the hydraulically-actuated cylinder and piston assembly includes:

a hydraulic cylinder;

at least two ports in the cylinder for conducting hydraulic fluid into and out of the cylinder, the ports being spaced apart axially on the cylinder;

an annular surface portion on an inner surface of the cylinder positioned between the ports;

at least one groove on the inner surface of the cylinder, the groove extending between a first port of the ports and a rest position;

a piston slidably disposed in the cylinder for moving from the rest position toward the first port in response to a hydraulic fluid signal acting through the ports; and means for returning the piston to the rest position int he absence of a hydraulic fluid signal.

* * * * *